F. C. ZEISBERG.
PROCESS OF CONCENTRATING NITRIC ACID AND APPARATUS FOR USE IN CONNECTION THEREWITH.
APPLICATION FILED JUNE 30, 1917.

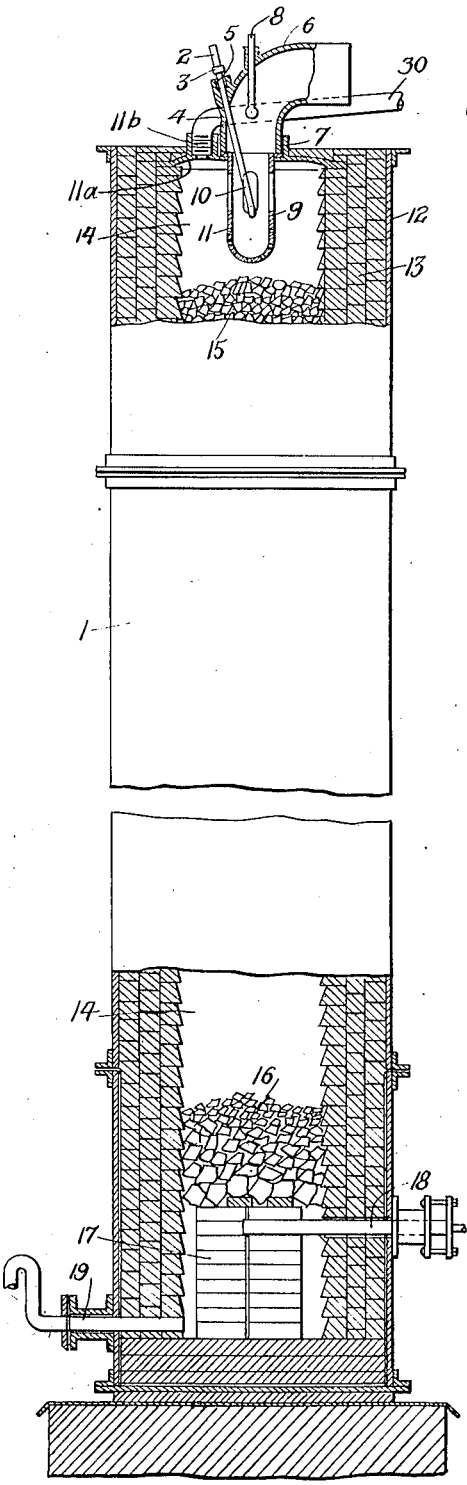

1,292,948.

Patented Jan. 28, 1919.
2 SHEETS—SHEET 2.

UNITED STATES PATENT OFFICE.

FRED C. ZEISBERG, OF WILMINGTON, DELAWARE, ASSIGNOR TO E. I. DU PONT DE NEMOURS AND COMPANY, OF WILMINGTON, DELAWARE, A CORPORATION OF DELAWARE.

PROCESS OF CONCENTRATING NITRIC ACID AND APPARATUS FOR USE IN CONNECTION THEREWITH.

1,292,948.

Specification of Letters Patent.

Patented Jan. 28, 1919.

Application filed June 30, 1917. Serial No. 177,960.

*To all whom it may concern:*

Be it known that I, FRED C. ZEISBERG, of Wilmington, in the county of New Castle, and in the State of Delaware, have invented a certain new and useful Improvement in Processes of Concentrating Nitric Acid and Apparatus for Use in Connection Therewith, and do hereby declare that the following is a full, clear, and exact description thereof.

My invention relates particularly to a process designed for concentrating nitric acid and is applicable to the production of nitric acid of various degrees of concentration, and it relates also to the apparatus used in connection therewith.

The object of my invention is to provide a process and apparatus for use in connection therewith in which nitric acid of a high degree of concentration may be obtained, and in which, if desired, all of the nitric acid may be obtained in a concentrated form. Further objects of my invention are to provide a process in which the temperatures are maintained within certain limits, in which there is utilized the proper proportion of sulfuric acid to nitric acid, in which there is a uniform distribution of the acids in the tower in which the concentration is being effected, in which a uniform filling material is provided in the concentrating tower, in which the uncondensed gases are recovered by the action of water and air and absorption in water, in which the weak acid formed by such absorption is returned to the main body of acid for concentration, and in which a tower is used constructed so as to prevent leakage. Further objects of my invention will appear from a detailed description thereof contained hereinafter.

While my process is capable of being carried out in many different ways and is capable of being used in connection with many different types of apparatus, I have described only one form of my invention hereinafter, and have shown only one form of apparatus in the accompanying drawings, in which—

Figure 1 is a vertical section of a concentrating tower used in connection with my invention;

Fig. 2 is a horizontal section of the same;

Fig. 3 is a plan view of the same; and

Figure 4:
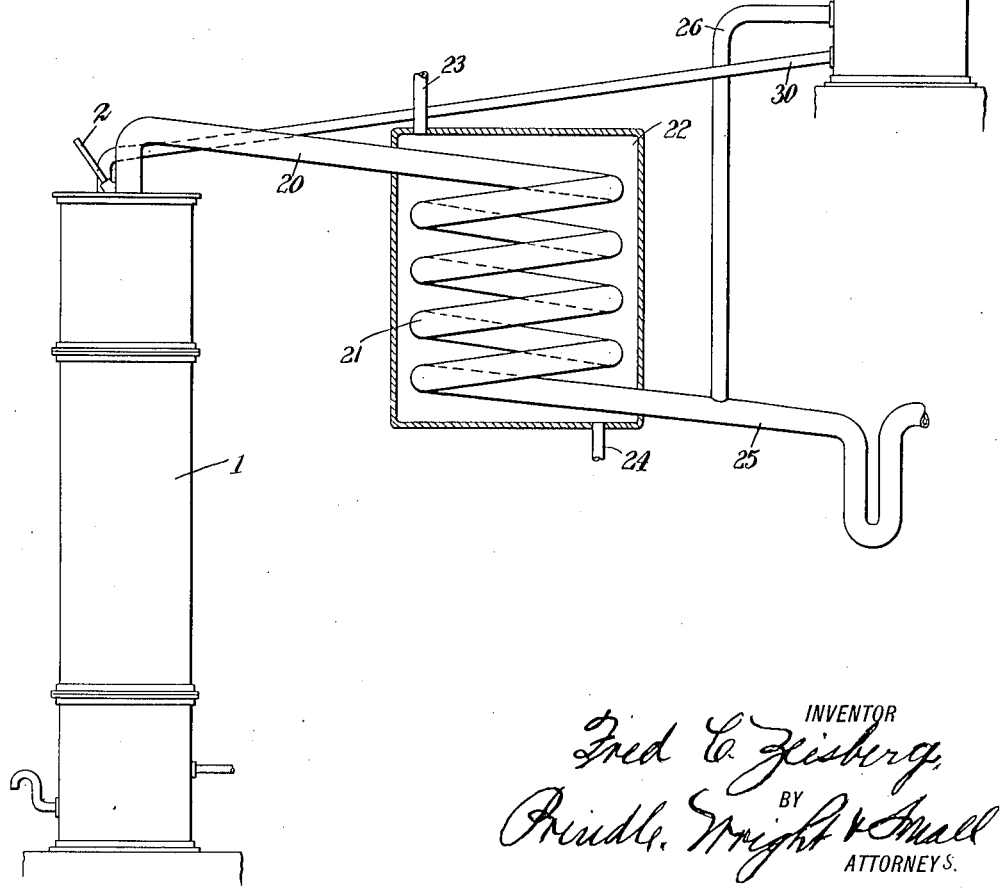
Fig. 4 is a diagrammatic representation showing the entire apparatus.

In the drawings I have shown a concentrating tower 1. Mixed nitric and sulfuric acids are supplied to the tower 1, by means of a pipe 2 having a coupling 3 connecting it to a glass tube 4, passing through a hole 5 in a distributer coupling 6, the end of which rests in a casting 7 in the top of the tower 1. The coupling 6 has projecting into the same a thermometer 8. Extending from the lower end of the coupling 6 downwardly into the tower 1, there is a distributer 9 having a plurality of lateral openings 10, to permit the exit of nitric acid vapors mixed with some steam and having also a number of smaller openings 11 in its lower portion for distributing the mixed acids into the tower. The distributer 9 rests in a plate $11^a$ having an opening $11^b$ to receive the dilute acid formed in a later stage of the process as hereinafter described. The plate $11^a$ rests upon the top of the tower 1 which is composed of a cylindrical outer casing 12, preferably made of steel and filled with a number of layers of bricks 13, extending around the interior thereof in such a manner as to leave a central opening 14. The central opening 14 is filled to a point just below the lower end of the distributer 9 with pieces of quartz 15 or other similar material of uniform size, preferably from 2" to 3" in diameter and placed in a uniform manner in the tower. While smaller materials cut down the capacity of the tower, larger materials produce interstices which are too large to afford the proper dephlegmating action. Furthermore, the quartz should be selected for freedom from disintegration under the influence of heat and acid. These pieces of quartz rest upon a number of large blocks of quartz 16 at the bottom of the tower which in turn rest upon a number of overlapping bricks 17 arranged for protecting the end of a centrally located inlet pipe 18, provided for admitting steam. At the extreme lower end of the tower there is a sulfuric acid outlet pipe 19. The steam admitted to the tower 1, through the pipe 18 causes the nitric acid to be vaporized while the water is retained to a very large extent by the sulfuric acid present. The vapors of nitric acid together with a little steam pass out of the distributer coupling 6 at the top of the tower and through a pipe 20 to a condensing coil 21 located in a container 22 provided with inlet and outlet pipes for cold water 23 and 24. The condensed nitric acid is drawn off from the condenser by means of a trapped pipe 25. The uncondensed vapors are conveyed away from the pipe 25 by means of a pipe 26 to an absorption tower 27 constructed in any suitable manner in which the vapors are subjected to a current of water supplied through a pipe 28. Any vapors remaining unabsorbed are conveyed away by a pipe 29 at the top of the tower 27. The dilute nitric acid formed by the absorption of the vapors in the water is conveyed by a pipe 30 to the opening $11^b$ in the tower 1 so that it may be subjected to concentration in the tower 1 together with the mixed acids introduced into the same through the pipe 2.

In the operation of my invention, mixed nitric and sulfuric acids, and which may be the mixed acids obtained from cellulose nitration or other similar acids, are allowed to pass into the tower 1 through the pipe 2. I have found that the composition of the mixed acids should be such as to have the percentage of nitric acid in the mixture bear a certain relation to the amount of sulfuric acid therein. Another way of expressing it is, to maintain a given "S" where S is a comparison between the sulfuric acid in the mixture and the sum of the sulfuric acid and the water. This may be expressed in percentages as follows:

$$S = \frac{100 \times \% H_2SO_4}{100 - \% HNO_3}.$$

With a tower having an internal diameter of 21 in. and a height of 24 ft., the S should not be below 71% for a mixture containing 10% $HNO_3$, nor below 80% for a mixture containing 20% $HNO_3$. This end is conveniently attained by keeping the percentage of $H_2SO_4$ in the mixture above 64%, regardless of the nitric acid content, provided the latter lies between the limits of 10% and 25%. Below 10% $HNO_3$ and down to 3% $HNO_3$ it is advisable to have more than 64% $H_2SO_4$. While the S may be higher than the figures given above, it is desirable to keep it as low as possible for economical reasons, so that a given amount of $HNO_3$ may be concentrated by means of a minimum amount of $H_2SO_4$. If the S is run up very much higher than the figures given, especially with the lower percentages of $HNO_3$, the mixture will not behave properly in the towers. These proportions are advisable in order to secure acid having the desired concentration, as in operating my process it is desired to obtain nitric acid having strengths of 90 to 99.7% $HNO_3$. The acid thus introduced into the tower 1 will be uniformly distributed by the openings 11 over the surface of filling material 15, which owing to their size and uniform placing avoid local over-heating due to any stagnation of portions of the acid in the tower 1, and bring about an intimate contact between the ascending vapors and the descending liquids. The temperature at the top of the tower 1 is maintained at about 205° F. However, the temperature may go as low as 195° F., and it might at times rise as high as 215° F. I desire, however, to maintain the temperature as far as possible at 205° F. or lower. The nitric acid vapors pass out of the tower 1 through the openings 10 and thence through the pipe 20 to the condenser 21 where the strong nitric acid is condensed and carried off by the pipe 25. Any remaining oxids of nitrogen pass by means of the pipe 26 into the absorption tower 27 where they are subjected to the action of water and the air which is necessarily present so that said vapors become oxidized and absorbed in water to form dilute nitric acid which is returned by the pipe 30 to the tower 1 to be concentrated with the mixed acids. Any unabsorbed vapors pass off by the pipe 29.

While I have described my invention above in detail, I wish it to be understood that many changes may be made therein without departing from the spirit of my invention.

I claim:

1. The process which comprises subjecting nitric acid and sulfuric acid containing not less than 64% of sulfuric acid and from 3% to 25% of nitric acid to a hot gaseous current, conveying away the nitric acid vapors, and condensing the same.

2. The process which comprises subjecting nitric acid and sulfuric acid containing not less than 64% of sulfuric acid and from 3% to 25% of nitric acid to a current of steam, conveying away the nitric acid vapors, and condensing the same.

3. The process which comprises subjecting nitric acid, sulfuric acid and water in which the percentage of the sulfuric acid to the sulfuric acid and water is not below 71% to a hot gaseous current, conveying away the nitric acid vapors and condensing the same.

4. The process which comprises subjecting nitric acid, sulfuric acid and water in which the percentage of the sulfuric acid to the sulfuric acid and water is not below 71% to a current of steam, conveying away the nitric acid vapors, and condensing the same.

5. The process which comprises subjecting nitric acid and sulfuric acid to a hot gaseous current, by conducting the acids over uniformly sized and placed pieces of material from 2" to 3" in diameter, conveying away the nitric acid vapors and condensing the same.

6. The process which comprises subjecting nitric acid and sulfuric acid to a current of steam, by conducting the acids over uniformly sized and placed pieces of material from 2" to 3" in diameter, conveying away the nitric acid vapors and condensing the same.

7. The process which comprises subjecting nitric acid and sulfuric acid to a hot gaseous current, conveying away the nitric acid vapors, condensing the same and then passing the uncondensed vapors through an absorbing apparatus, and then conveying the resulting nitric acid to the mixed acids being subjected to the hot gaseous current.

8. The process which comprises subjecting nitric acid and sulfuric acid to a current of steam, conveying away the nitric acid vapors, condensing the same and then passing the uncondensed vapors through an absorbing apparatus, and then conveying the resulting nitric acid to the mixed acids being subjected to the current of steam.

9. The process which comprises subjecting nitric acid and sulfuric acid to a hot gaseous current, conveying away the nitric acid vapors, condensing the same and then passing the uncondensed vapors through an absorbing apparatus, having an oppositely flowing current of water therein, and then conveying the resulting nitric acid to the mixed acids being subjected to the hot gaseous current.

10. The process which comprises subjecting nitric acid and sulfuric acid to a current of steam, conveying away the nitric acid vapors, condensing the same and then passing the uncondensed vapors through an absorbing apparatus, having an oppositely flowing current of water therein, and then conveying the resulting nitric acid to the mixed acids being subjected to the hot gaseous current.

11. The process which comprises subjecting nitric acid and sulfuric acid to a hot gaseous current, uniformly distributing the mixed acids over a filling material, conveying away the nitric acid vapors and condensing the same.

12. The process which comprises subjecting nitric acid and sulfuric acid to a current of steam, uniformly distributing the mixed acids over a filling material, conveying away the nitric acid vapors and condensing the same.

13. The process which comprises subjecting nitric acid and sulfuric acid to a hot gaseous current while maintaining the temperature of the nitric acid vapors at about 205° F., conveying away the nitric acid vapors, and condensing the same.

14. The process which comprises subjecting nitric acid and sulfuric acid to a current of steam while maintaining the temperature of the nitric acid vapors at about 205° F., conveying away the nitric acid vapors, and condensing the same.

15. The process which comprises subjecting nitric acid and sulfuric acid to a hot gaseous current while maintaining the temperature of the nitric acid vapors at least as low as 205° F., conveying away the nitric acid vapors, and condensing the same.

16. The process which comprises subjecting nitric acid and sulfuric acid to a current of steam while maintaining the temperature of the nitric acid vapors at least as low as 205° F., conveying away the nitric acid vapors, and condensing the same.

17. In combination, an acid concentrating tower, an acid distributer therein, said acid distributer having a plurality of uniformly discharging acid openings and an outlet opening for vapors.

18. In combination, an acid concentrating tower and an acid distributer therein, said acid distributer having a plurality of radiating uniformly discharging acid openings and an outlet opening for vapors.

19. In combination, an acid concentrating tower, an acid distributer therein, said acid distributer having a plurality of uniformly discharging acid openings and an outlet opening for vapors above the acid discharge openings.

20. In combination, an acid concentrating tower, an acid distributer therein, said acid distributer having a plurality of radiating uniformly discharging acid openings and an outlet opening for vapors above the acid discharge openings.

21. In combination, an acid concentrating apparatus, a vapor outlet pipe, a condenser, a vapor outlet pipe from the condenser, and an absorbing apparatus connected thereto, adapted to discharge the acid into said concentrating apparatus.

22. In combination, an acid concentrating apparatus, a vapor outlet pipe, a condenser, a vapor outlet pipe from the condenser, and an absorbing apparatus connected thereto, provided with means for supplying a current of water thereto, adapted to discharge the acid into said concentrating apparatus.

23. In combination, an acid concentrating apparatus, a vapor outlet pipe, a condenser, a vapor outlet pipe from the condenser, and an absorbing apparatus connected thereto, provided with means for supplying a current of water thereto in the opposite direction to the gaseous current, adapted to discharge the acid into said concentrating apparatus.

24. In combination, an acid concentrating apparatus, a vapor outlet pipe, a condenser, a vapor outlet pipe from the condenser, an absorbing apparatus connected thereto, and means for conveying the acid from the absorbing apparatus to the concentrating apparatus.

25. In combination, an acid concentrating apparatus, a vapor outlet pipe, a condenser, a vapor outlet pipe from the condenser, and an absorbing apparatus connected thereto, provided with means for supplying a current of water thereto, and means for conveying the acid from the absorbing apparatus to the concentrating apparatus.

26. In combination, an acid concentrating apparatus, a vapor outlet pipe, a condenser, a vapor outlet pipe from the condenser, an absorbing apparatus connected thereto, provided with means for supplying a current of water thereto in the opposite direction to the gaseous current, and means for conveying the acid from the absorbing apparatus to the concentrating apparatus.

27. In combination, an acid concentrating tower having a cover, and an acid distributer depending from the cover, said acid distributer having an acid discharging opening.

28. In combination an acid concentrating tower and an acid distributer therein, said acid distributer having a plurality of radiating uniformly discharging acid openings extending up the side thereof.

29. In combination an acid concentrating tower and an acid distributer therein, said acid distributer having straight sides and a curved bottom provided with a plurality of uniformly discharging acid openings.

30. In combination an acid concentrating tower having a cover, an acid distributer depending from the cover, said acid distributer having a plurality of acid discharging openings and an outlet opening for vapors, a distributer coupling in said cover connecting with said acid distributer, said distributer coupling having an opening for an acid inlet pipe and for a thermometer, and a return pipe in said cover.

In testimony that I claim the foregoing I have hereunto set my hand.

FRED C. ZEISBERG.

Witnesses:
P. E. STRICKLAND,
FREDERICK L. GALLUP.